(No Model.)

G. W. GRIFFIN.
SAW BLADE.

No. 412,176. Patented Oct. 1, 1889.

Witnesses.
Fred. L. Greene
Frederick L. Emery

Inventor.
George W. Griffin,
By Crosby & Gregory
attys

UNITED STATES PATENT OFFICE.

GEORGE W. GRIFFIN, OF FRANKLIN FALLS, NEW HAMPSHIRE, ASSIGNOR OF ONE-HALF TO PARKER C. HANCOCK, OF SAME PLACE.

SAW-BLADE.

SPECIFICATION forming part of Letters Patent No. 412,176, dated October 1, 1889.

Application filed February 18, 1889. Serial No. 300,275. (No model.)

*To all whom it may concern:*

Be it known that I, GEORGE W. GRIFFIN, of Franklin Falls, county of Merrimac, State of New Hampshire, have invented an Improvement in Saw-Blades, of which the following description, in connection with the accompanying drawings, is a specification, like letters on the drawings representing like parts.

This invention has for its object to construct a saw-blade which may be firmly held by the jaws of the saw frame or apparatus.

In carrying out this invention I corrugate the ends of the saw-blade transversely and shape the jaws to engage the said corrugated ends of the blade.

Figure 1:
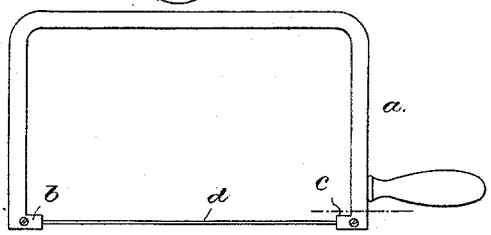
Figure 2:
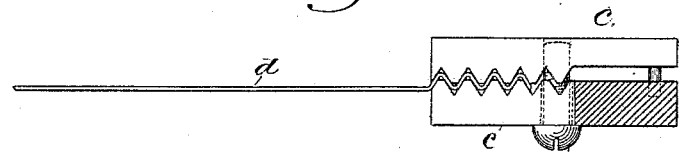
Figure 3:
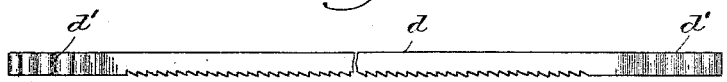

Figure 1 shows in side elevation a saw-frame having the ends of the blade corrugated in accordance with this invention; Fig. 2, an edge view of a portion of a saw-blade embodying this invention and a pair of jaws engaging the corrugated end thereof, and Fig. 3 is an enlarged side view of the saw-blade removed from the frame or carrier and broken out centrally to save space on the drawings.

The saw frame or carrier $a$ is and may be of usual shape and construction, it, as herein shown, having a handle by which to operate it. The frame or carrier is provided with two pairs of jaws $b$ $c$.

The saw-blade $d$ is corrugated at each end, as at $d'$, to present a surface capable of being engaged and firmly held by the jaws, having projections to enter and notches to receive the said transverse corrugations, as shown in Fig. 2. The jaws may be clamped together in any usual manner, as by a screw $r$.

By this invention the ends of the saw-blade may be firmly grasped and held by the jaws without liability of slipping.

The corrugations (shown as easy curves) are permanent, they being well defined therein before the blade is applied between the jaws.

I am aware that tools having roughened shanks have been held in jaws, and that the straight ends of a saw-blade have been squeezed between jaws having ratchet-shaped teeth.

I claim—

The herein-described jig-saw blade, having at its opposite ends a series of permanent corrugations transverse to the length of the blade, substantially as shown and described.

In testimony whereof I have signed my name to this specification in the presence of two subscribing witnesses.

GEORGE W. GRIFFIN.

Witnesses:
 FRANK PROCTOR,
 JOHN P. PROCTOR.